United States Patent
Welton et al.

(10) Patent No.: US 7,261,160 B2
(45) Date of Patent: Aug. 28, 2007

(54) METHODS AND COMPOSITIONS FOR CONTROLLING THE VISCOSITY OF VISCOELASTIC SURFACTANT FLUIDS

(75) Inventors: Thomas D. Welton, Duncan, OK (US); Rick D. Gdanski, Duncan, OK (US); Richard W. Pauls, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/225,536

(22) Filed: Sep. 13, 2005

(65) Prior Publication Data

US 2007/0056736 A1 Mar. 15, 2007

(51) Int. Cl.
*E21B 43/27* (2006.01)
*C09K 8/60* (2006.01)

(52) U.S. Cl. ...................... 166/300; 166/279

(58) Field of Classification Search ...................... None
See application file for complete search history.

(56) References Cited

U.S. PATENT DOCUMENTS

| | | | |
|---|---|---|---|
| 3,747,681 A | 7/1973 | Davis et al. | |
| 3,822,746 A | 7/1974 | Gogarty | |
| 4,061,580 A | 12/1977 | Jahnke | |
| 4,130,491 A | 12/1978 | Wagner et al. | |
| 4,215,001 A | 7/1980 | Elphingstone et al. | |
| 4,231,882 A | 11/1980 | Elphingstone et al. | |
| 4,237,975 A | 12/1980 | Scherubel | |
| 4,324,669 A | 4/1982 | Norman et al. | |
| 4,369,124 A | 1/1983 | Elphingstone et al. | |
| 4,412,586 A | 11/1983 | Sifferman et al. | |
| 4,480,696 A | 11/1984 | Almond et al. | |
| 4,495,389 A | 1/1985 | Place | |
| 4,503,170 A | 3/1985 | Drake et al. | |
| 4,519,455 A | 5/1985 | Holtmyer et al. | |
| 4,534,875 A | 8/1985 | Rose | |
| 4,541,935 A | 9/1985 | Constien et al. | |
| 4,591,447 A | 5/1986 | Kubala | |
| 4,615,825 A | 10/1986 | Teot et al. | |
| 4,654,158 A | 3/1987 | Shepherd | |
| 4,694,906 A | 9/1987 | Hutchins et al. | |
| 4,725,372 A | 2/1988 | Teot et al. | |
| 4,735,731 A | 4/1988 | Rose et al. | |
| 4,737,296 A | 4/1988 | Watkins | |
| 4,770,814 A | 9/1988 | Rose et al. | |
| 4,800,036 A | 1/1989 | Rose et al. | |
| 4,806,256 A | 2/1989 | Rose et al. | |
| 4,842,771 A | 6/1989 | Rorig et al. | |
| 4,861,517 A | 8/1989 | Bade | |
| 5,009,799 A | 4/1991 | Syrinek et al. | |
| 5,074,358 A | 12/1991 | Rendall et al. | |
| 5,203,411 A | 4/1993 | Dawe et al. | |
| 5,258,137 A | 11/1993 | Bonekamp et al. | |
| 5,354,906 A | 10/1994 | Weitemeyer et al. | |
| 5,439,615 A | 8/1995 | Lefebvre et al. | |
| 5,551,516 A | 9/1996 | Norman et al. | |
| 5,807,810 A | 9/1998 | Blezard et al. | |
| 5,964,295 A | 10/1999 | Brown et al. | |
| 5,979,555 A | 11/1999 | Gadberry et al. | |
| 6,140,277 A | 10/2000 | Tibbles et al. | |
| 6,169,058 B1 * | 1/2001 | Le et al. ...................... | 507/222 |
| 6,194,356 B1 | 2/2001 | Jones et al. | |
| 6,232,274 B1 | 5/2001 | Hughes et al. | |
| 6,258,859 B1 | 7/2001 | Dahayanake et al. | |
| 6,399,546 B1 | 6/2002 | Chang et al. | |
| 6,433,075 B1 | 8/2002 | Davies et al. | |
| 6,491,099 B1 | 12/2002 | Di Lullo Arias et al. | |
| 6,544,934 B2 | 4/2003 | Taylor et al. | |
| 6,605,570 B2 | 8/2003 | Miller et al. | |
| 6,762,154 B2 | 7/2004 | Lungwitz et al. | |
| 6,828,280 B2 | 12/2004 | England et al. | |
| 6,861,386 B2 | 3/2005 | Angeletakis et al. | |
| 6,875,728 B2 | 4/2005 | Gupta et al. | |

(Continued)

FOREIGN PATENT DOCUMENTS

GB 2191716 A 12/1987

(Continued)

OTHER PUBLICATIONS

Al-Ghamdi, Abdul Wahab H, et al., "Impact of Acid Additives on the Rheological Properties of Viscoelastic Surfactants and . . . " SPE 89418 (Apr. 17, 2004).

*Primary Examiner*—Zakiya Bates
*Assistant Examiner*—Angela DiTrani
(74) *Attorney, Agent, or Firm*—Robert A. Kent; Baker Botts

(57) ABSTRACT

Viscoelastic surfactant fluids, and methods of using such fluids and controlling the viscosity thereof. In one embodiment, the methods of the present invention comprise: providing a viscoelastic surfactant fluid that comprises an aqueous-base fluid, and a surfactant; providing a metal ion having at least two oxidation states wherein at least one of the oxidation states interferes with the ability of the surfactant to form a viscosifying micelle, wherein at least a portion of the metal ion is present in an oxidation state that interferes with the ability of the surfactant to form a viscosifying micelle; allowing the metal ion to interact with viscoelastic surfactant fluid so as to decrease the ability of the surfactant to form a viscosifying micelle; and introducing the viscoelastic surfactant fluid into at least a portion of a subterranean formation.

24 Claims, No Drawings

U.S. PATENT DOCUMENTS

| | | | |
|---|---|---|---|
| 6,881,709 B2 | 4/2005 | Nelson et al. | |
| 6,883,608 B2 | 4/2005 | Parlar et al. | |
| 6,903,054 B2 | 6/2005 | Fu et al. | |
| 6,929,070 B2 * | 8/2005 | Fu et al. | 166/308.2 |
| 2002/0076803 A1 | 6/2002 | Crews | |
| 2003/0119680 A1 | 6/2003 | Chang et al. | |
| 2003/0236179 A1 | 12/2003 | Bodet et al. | |
| 2004/0053789 A1 | 3/2004 | Jones et al. | |
| 2004/0063587 A1 | 4/2004 | Horton et al. | |
| 2004/0094301 A1 | 5/2004 | Hughes et al. | |
| 2004/0102331 A1 | 5/2004 | Chan et al. | |
| 2004/0138071 A1 * | 7/2004 | Gupta et al. | 507/200 |
| 2004/0152604 A1 | 8/2004 | Qu et al. | |
| 2004/0176478 A1 | 9/2004 | Metzmaier et al. | |
| 2005/0026789 A1 | 2/2005 | Marakov | |
| 2005/0067165 A1 | 3/2005 | Cawiezel et al. | |
| 2005/0107265 A1 | 5/2005 | Sullivan et al. | |
| 2005/0124525 A1 | 6/2005 | Hartshorne et al. | |
| 2005/0126778 A1 | 6/2005 | McElfresh et al. | |
| 2005/0126786 A1 | 6/2005 | Fu et al. | |
| 2005/0137095 A1 | 6/2005 | Cawiezel et al. | |
| 2006/0041028 A1 * | 2/2006 | Crews | 516/135 |

FOREIGN PATENT DOCUMENTS

| | | |
|---|---|---|
| WO | WO2005040552 A1 | 5/2005 |
| WO | WO2005040554 A1 | 5/2005 |
| WO | WO 2005/121273 A1 | 12/2005 |

* cited by examiner

METHODS AND COMPOSITIONS FOR CONTROLLING THE VISCOSITY OF VISCOELASTIC SURFACTANT FLUIDS

CROSS-REFERENCE TO RELATED APPLICATIONS

This application is related to co-pending U.S. patent application Ser. No. 11/225,537, entitled "Methods and Compositions for Controlling the Viscosity of Viscoelastic Surfactant Fluids," filed on the same day, the entirety of which is herein incorporated by reference.

BACKGROUND

The present invention relates to fluids useful in subterranean operations, and more particularly, to viscoelastic surfactant fluids, and methods of using such fluids and controlling the viscosity thereof.

Viscosified treatment fluids may be used in a variety of subterranean treatments. Such treatments include, but are not limited to, drilling operations, stimulation treatments, and sand control treatments. As used herein, the term "treatment," or "treating," refers to any subterranean operation that uses a fluid in conjunction with a desired function and/or for a desired purpose. The term "treatment," or "treating," does not imply any particular action by the fluid.

An example of one such subterranean treatment is a drilling operation, wherein a treatment fluid (e.g., a drilling fluid) passes down through the inside of the drill string, exits through the drill bit, and returns to the drilling rig through the annulus between the drill string and well bore. The circulating drilling fluid, among other things, lubricates the drill bit, transports drill cuttings to the surface, and balances the formation pressure exerted on the well bore. Drilling fluids typically require sufficient viscosity to suspend drill cuttings. Viscosified treatment fluids also may be used in other operations to transport and remove formation particulates from the well bore or the near well bore region. In some instances, these formation particulates may be generated during the course of drilling, digging, blasting, dredging, tunneling, and the like in the subterranean formation.

A common production stimulation operation that employs a viscosified treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. The fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the well bore. Once at least one fracture is created and the proppant particulates are substantially in place, the viscosity of the fracturing fluid usually is reduced (i.e., "breaking" the fluid), and the fracturing fluid may be recovered from the formation. The term "break" and its derivatives, as used herein, refer to a reduction in the viscosity of a fluid, e.g., by the breaking or reversing of the crosslinks between polymer molecules in the fluid, or breaking chemical bonds of gelling agent polymers in the fluid. No particular mechanism is implied by the term.

Another production stimulation operation that employs a viscosified treatment fluid is an acidizing treatment. In acidizing treatments, subterranean formations comprising acid-soluble components, such as those present in carbonate and sandstone formations, are contacted with a treatment fluid comprising an acid. For example, where hydrochloric acid contacts and reacts with calcium carbonate in a formation, the calcium carbonate is consumed to produce water, carbon dioxide, and calcium chloride. After acidization is completed, the water and salts dissolved therein may be recovered by producing them to the surface, e.g., "flowing back" the well, leaving a desirable amount of voids (e.g., wormholes) within the formation, which enhance the formation's permeability and may increase the rate at which hydrocarbons may subsequently be produced from the formation.

Viscosified treatment fluids are also utilized in sand control treatments, such as gravel-packing treatments, wherein a treatment fluid, which is usually viscosified, suspends particulates (commonly referred to as "gravel particulates") for delivery to a desired area in a well bore, e.g., near unconsolidated or weakly consolidated formation zones, to form a gravel pack to enhance sand control. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid is often reduced to allow it to be recovered. In some situations, fracturing and gravel-packing treatments are combined into a single treatment (commonly referred to as "frac pack" operations) to provide stimulated production and an annular gravel pack to reduce formation sand production.

In a variety of subterranean operations, it also may be desirable to divert treatment fluids in a subterranean formation because, among other reasons, the treatment fluid may enter portions of a subterranean formation with high permeability preferentially at the expense of portions of the subterranean formation with lesser permeability. For example, in acid stimulation operations, it may be desired to contact less permeable portions of the subterranean formation with a treatment fluid containing an acid so as to achieve the desired stimulation. Certain diverting techniques involve the placement of viscosified fluids in a subterranean formation so as to plug off the high-permeability portions of the formation, thereby diverting subsequently injected fluids to less permeable portions of the formation. In certain techniques, a treatment fluid is placed adjacent to a certain portion of a subterranean formation, and the treatment fluid is viscosified so as to form a gel that, inter alia, temporarily plugs the perforations or natural fractures in that portion of the formation. The term "gel," as used herein, and its derivatives include semi-solid, jelly-like states assumed by some colloidal dispersions. When another treatment fluid encounters the gel, it may be diverted to other portions of the formation.

Maintaining sufficient viscosity in treatment fluids may be important for a number of reasons. Viscosity is desirable in drilling operations since treatment fluids with higher viscosity can, among other things, transport solids, such as drill cuttings, more readily. Maintaining sufficient viscosity is important in fracturing treatments for particulate transport, as well as to create or enhance fracture width. Particulate transport is also important in sand control treatments, such as gravel packing. Maintaining sufficient viscosity may be important to control and/or reduce leak-off into the formation, improve the ability to divert another fluid in the formation, and/or reduce pumping requirements by reducing friction in the well bore. At the same time, while maintaining sufficient viscosity of a treatment fluid often is desirable, it also may be desirable to maintain the viscosity of the treatment fluid in such a way that the viscosity may be reduced at a particular time, inter alia, for subsequent recovery of the fluid from the formation.

To provide the desired viscosity, polymeric gelling agents commonly are added to the treatment fluids. The term "gelling agent" is defined herein to include any substance that is capable of increasing the viscosity of a fluid, for example, by forming a gel. Examples of commonly used polymeric gelling agents include, but are not limited to guar gums and derivatives thereof, cellulose derivatives, biopolymers, and the like. The use of polymeric gelling agents, however, may be problematic. For instance, these polymeric gelling agents may leave an undesirable gel residue in the subterranean formation after use, which can impact permeability. As a result, costly remedial operations may be required to clean up the fracture face and proppant pack. Foamed treatment fluids and emulsion-based treatment fluids have been employed to minimize residual damage, but increased expense and complexity often have resulted.

To combat perceived problems associated with polymeric gelling agents, some surfactants have been used as gelling agents. It is well understood that, when mixed with a fluid in a concentration above the critical micelle concentration, the molecules (or ions) of surfactants may associate to form micelles. The term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. These micelles may function, among other purposes, to stabilize emulsions, break emulsions, stabilize a foam, change the wettability of a surface, solubilize certain materials, and/or reduce surface tension. When used as a gelling agent, the molecules (or ions) of the surfactants used associate to form micelles of a certain micellar structure (e.g., rodlike, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid and/or forming a gel. Certain viscosifying micelles may impart increased viscosity to a fluid such that the fluid exhibits viscoelastic behavior (e.g., shear thinning properties) due, at least in part, to the association of the surfactant molecules contained therein. As used herein, the term "viscoelastic surfactant fluid" refers to fluids that exhibit or are capable of exhibiting viscoelastic behavior due, at least in part, to the association of surfactant molecules contained therein to form viscosifying micelles. Moreover, because the viscosifying micelles may be sensitive to hydrocarbons, the viscosity of these viscoelastic surfactant fluids may be reduced after introduction into the subterranean formation without the need for certain types of gel breakers (e.g., oxidizers). The term "breaker" is defined herein to include any substance that is capable of decreasing the viscosity of a fluid. This may allow a substantial portion of the viscoelastic surfactant fluids to be produced back from the formation without the need for expensive remedial treatments.

However, the use of surfactants as gelling agents may be problematic in several respects. First, high concentrations (i.e., above about 2,000 parts per million ("ppm")) of certain metal ions such as iron may make the use of surfactants as gelling agents impractical because such metal ions may interfere with the ability of the surfactant molecules to form viscosifying micelles. Lower concentrations (i.e., above about 800 ppm) of certain metal ions also may interfere with the ability of the surfactant molecules to form viscosifying micelles. Moreover, conventional methods of reducing the viscosity of a viscoelastic surfactant fluid generally rely on formation fluids and/or the addition of hydrocarbons (e.g., in an oil-emulsified acid) to provide the conditions needed to reduce the viscosity of the fluid, each of which may be undesirable for any number of reasons. Reliance on formation fluids to provide the conditions needed to reduce the viscosity of the fluid may delay the progress of a particular subterranean operation. Altering the pH of the viscoelastic surfactant fluid may, inter alia, require the addition of additives that increase the cost and/or complexity of the fluid, cause damage to certain substances present within the formation (e.g., minerals), and/or create pH conditions that are undesirable for subsequent operations to be performed. Finally, the addition of an oil-phase additive to an aqueous treatment fluid may, inter alia, decrease the relative permeability of a formation, causing it to become oil-wet, or forming an emulsion, any of which may hinder the production of fluids from the formation.

SUMMARY

The present invention relates to fluids useful in subterranean operations, and more particularly, to viscoelastic surfactant fluids, and methods of using such fluids and controlling the viscosity thereof.

In one embodiment, the present invention provides a method comprising: providing a viscoelastic surfactant fluid that comprises an aqueous-base fluid, and a surfactant; providing a metal ion having at least two oxidation states wherein at least one of the oxidation states interferes with the ability of the surfactant to form a viscosifying micelle, wherein at least a portion of the metal ion is present in an oxidation state that interferes with the ability of the surfactant to form a viscosifying micelle; allowing the metal ion to interact with viscoelastic surfactant fluid so as to interfere with the ability of the surfactant to form a viscosifying micelle; and introducing the viscoelastic surfactant fluid into at least a portion of a subterranean formation.

In another embodiment, the present invention provides a method comprising: providing a viscoelastic surfactant fluid that comprises an aqueous-base fluid, a surfactant, and a metal ion having at least two oxidation states wherein at least one of the oxidation states interferes with the ability of the surfactant to form a viscosifying micelle, wherein at least a portion of the metal ion is present in an oxidation state that interferes with the ability of the surfactant to form a viscosifying micelle; introducing the viscoelastic surfactant fluid into at least a portion of a subterranean formation; providing a redox reagent that is capable of changing the oxidation state of the metal ion to an oxidation state different from that which interferes with the ability of the surfactant to form a viscosifying micelle; allowing the redox reagent to interact with the metal ion, thereby changing the oxidation state of at least a portion of the metal ion to an oxidation state different from that which interferes with the ability of the surfactant to form a viscosifying micelle; and allowing the surfactant to form at least one viscosifying micelle, thereby facilitating an increase in the viscosity of the viscoelastic surfactant fluid.

In another embodiment, the present invention provides a method comprising: providing a viscoelastic surfactant fluid that comprises an aqueous-base fluid, a surfactant, and a metal ion having at least two oxidation states wherein at least one of the oxidation states interferes with the ability of the surfactant to form a viscosifying micelle; providing a redox reagent that is capable of changing the oxidation state of the metal ion to an oxidation state that interferes with the ability of the surfactant to form a viscosifying micelle; allowing the redox reagent to change the oxidation state of at least a portion of the metal ion to an oxidation state that interferes with the ability of the surfactant to form a viscosifying micelle; and allowing the metal ion to interact with viscoelastic surfactant fluid so as to interfere with the ability of the surfactant to form a viscosifying micelle.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to fluids useful in subterranean operations, and more particularly, to viscoelastic surfactant fluids, and methods of using such fluids and controlling the viscosity thereof. The compositions and methods of the present invention may be used, among other things, to control the viscosity of a viscoelastic surfactant fluid, for example, by controlling the adverse effect of certain metal ions in a viscoelastic surfactant fluid on the ability of the surfactant molecules therein to form viscosifying micelles in a concentration sufficient to form a gel. Among other things, the viscosity of the viscoelastic surfactant fluids may be controlled (e.g., increased or decreased) without the need to add hydrocarbon substances to the fluid or rely on formation fluids to provide the conditions needed to reduce the viscosity of the fluid. For example, the methods and compositions of the present invention may be used to maintain a lower level of viscosity in a viscoelastic surfactant fluid, among other circumstances, while the fluid is being introduced into a subterranean formation and/or while the fluid is being recovered from the formation (e.g., as a breaker of the present invention). In other embodiments, the methods and compositions of the present invention may be used to maintain a higher level of viscosity in a viscoelastic surfactant fluid, among other circumstances, once it has been placed in a desired region of a subterranean formation (e.g., as a gelling agent of the present invention).

The viscoelastic surfactant fluids of the present invention comprise an aqueous-base fluid, a surfactant, and at least one metal ion having at least two oxidation states wherein at least one of the oxidation states interferes with the ability of the surfactant to a form viscosifying micelle. As used herein, the phrase "interferes with the ability of the surfactant to form a viscosifying micelle," and derivatives thereof, includes any chemical or mechanical interaction (e.g., ionic interactions, van der Waals interaction, steric hindrance, etc.) that hinders the association of surfactant molecules into a viscosifying micelle, which may, inter alia, cause the surfactant molecules to dissociate and/or form micellar structures different from those of viscosifying micelles. No particular mechanism is implied by the term.

The aqueous-base fluid component included in the viscoelastic surfactant fluids of the present invention may comprise freshwater, saltwater (e.g., water containing one or more salts dissolved therein), brine (e.g., saturated saltwater), seawater, or combinations thereof. Generally, the water may be from any source, provided that it does not contain components that might adversely affect the stability and/or performance of the viscoelastic surfactant fluids of the present invention. For example, the presence of certain salts may interfere with the ability of the surfactant to form a viscosifying micelle.

The surfactants included in the viscoelastic surfactant fluids of the present invention may comprise any suitable surfactant that is capable of imparting viscoelastic properties to an aqueous fluid. These surfactants may be cationic, anionic, or amphoteric in nature, and comprise any number of different compounds, including methyl ester sulfonates (as described in U.S. patent application Ser. Nos. 11/058,660, 11/058,475, 11/058,612, and 11/058,611 filed Feb. 15, 2005), betaines, modified betaines, sulfosuccinates, taurates, amine oxides, ethoxylated fatty amines, quaternary ammonium compounds, derivatives thereof, and combinations thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds. The surfactant should be present in a viscoelastic surfactant fluid of the present invention in an amount sufficient to provide the desired viscosity (e.g., sufficient viscosity to divert flow, reduce fluid loss, suspend particulates, etc.) therein through formation of viscosifying micelles. In certain embodiments, the surfactant may be present in an amount in the range of from about 0.1% to about 20% by volume of the viscoelastic surfactant fluid. In certain embodiments, the surfactant may be present in an amount in the range of from about 2% to about 10% by volume of the viscoelastic surfactant fluid.

The viscoelastic surfactant fluids of the present invention comprise at least one metal ion having at least two oxidation states wherein at least one of the oxidation states interferes with the ability of the surfactant to form viscosifying micelles. The metal ion may be present in any of its oxidation states, or in a mixture thereof, depending upon the viscoelastic properties of the fluid desired for a particular use of a fluid and/or stage of that use. For example, if low level of viscosity is desired (e.g., below about 20 cP @ 511 $s^{-1}$), then at least a portion of the metal ion may be present in an oxidation state that interferes with the ability of the surfactant included in the fluid to form viscosifying micelles. However, if a higher viscosity is desired, then the portion of the metal ion in an oxidation state that interferes with the ability of the surfactant included in the fluid to form viscosifying micelles should be below a certain amount. In certain embodiments, the methods and compositions of the present invention may be utilized to maintain and/or impart a viscosity in a viscoelastic surfactant fluid above about 20 cP, as measured using a FANN Model 35A viscometer with a standard bob and sleeve using a #1 spring at 300 rpm (511 $s^{-1}$). One of ordinary skill with the benefit of this disclosure will recognize the oxidation state of the metal ion to include to produce the desired level of viscosity, depending on, among other factors, the type of surfactant used, the surfactant concentration, the type of metal ion, and other related factors.

In certain embodiments, the metal ion included in the viscoelastic surfactant fluids of the present invention may comprise iron, which has at least the iron II ($Fe^{2+}$) and iron III ($Fe^{3+}$) oxidation states. In those embodiments where the metal ion comprises iron, it is believed that at least the iron III oxidation state interferes with the ability of the surfactant in a viscoelastic surfactant fluid to form viscosifying micelles. Other examples of metal ions that may be included in the viscoelastic surfactant fluids of the present invention include, but are not limited to, zinc, tin, chromium, or any combination of suitable metal ions. For example, chromium III ($Cr^{3+}$), from compounds such as $Cr_2O_3$, may interfere with the ability of a surfactant in a viscoelastic surfactant fluid to form viscosifying micelles, while chromium VI ($Cr^{6+}$), from compounds such as $Cr_2O_3$, may not interfere with the ability of a surfactant in a viscoelastic surfactant fluid to form viscosifying micelles. In certain embodiments, the metal ions utilized in the present invention already may be present in a viscoelastic surfactant fluid whose viscosity is being controlled. In certain embodiments, the metal ions may be added to a viscoelastic surfactant fluid in an additive comprising those metal ions, for example, as a breaker and/or a gelling agent of the present invention. The metal ion may be provided, in a viscoelastic surfactant fluid of the present invention or in a separate additive comprising the ion (e.g., a breaker and/or a gelling agent of the present invention), as a bare ion, as a component of some other molecule, and/or as an ion that is chemically associated (e.g., chelated) with some other molecule. In embodiments wherein the metal ion is provided as a component of some other molecule, that molecule may be formulated to release the metal ion in a delayed manner and/or to be "triggered" to release the metal ion by certain conditions (e.g., temperature, pH, etc.). For example, a molecule comprising the metal ion may release the metal ion in a delayed manner by slowly dissolving in the aqueous-base fluid. One example of a substance that may release an iron ion in this manner is hematite.

In certain embodiments, the metal ion (or molecule comprising the metal ion) may be encapsulated with various materials, which, among other things, may delay its release into the viscoelastic surfactant fluid. Solid redox reagents can be encapsulated by spray coating a variety of materials thereon. Such coating materials include, but are not limited to, waxes, drying oils such as tung oil and linseed oil, polyurethanes and cross-linked partially hydrolyzed polyacrylics. The redox reagent also may be encapsulated in the form of an aqueous solution contained within a particulate porous solid material that remains dry and free flowing after absorbing an aqueous solution and through which the aqueous solution slowly diffuses. Examples of such particulate porous solid materials include, but are not limited to, diatomaceous earth, zeolites, silica, alumina, metal salts of alumino-silicates, clays, hydrotalcite, styrene-divinylbenzene based materials, cross-linked polyalkylacrylate esters, and cross-linked modified starches. In order to provide additional delay to the redox reagents encapsulated in a particulate porous solid material described above, an external coating of a polymeric material through which an aqueous solution slowly diffuses can be placed on the porous solid material. Examples of such polymeric materials include, but are not limited to, EDPM rubber, polyvinyldichloride (PVDC), nylon, waxes, polyurethanes and cross-linked partially hydrolyzed acrylics.

In certain embodiments of the present invention, the metal ion or combination of metal ions may be present in an amount in the range of from about 10 ppm to about 10,000 ppm by volume of the viscoelastic surfactant fluid. In certain embodiments, the metal ion or combination of metal ions may be present in an amount in the range of from about 100 ppm to about 2,000 ppm by volume of the viscoelastic surfactant fluid. The type and amount of the metal ion(s) suitable in a particular application of the present invention may depend upon a variety of factors, such as the type of surfactant present in the viscoelastic surfactant fluid, the temperature of the fluid, and the like. A person of ordinary skill, with the benefit of this disclosure, will recognize the appropriate type and amount of metal ions to include in a particular application of the present invention.

The viscoelastic surfactant fluids of the present invention may further comprise a "redox reagent," which is defined herein to include any substance that is capable of changing the oxidation state of a metal ion(s) to the desired oxidation state. For example, the redox reagent may comprise a reagent that is capable of changing the oxidation state of the metal ion to a state that exhibits a lesser tendency to interfere with the ability of the surfactant to form viscosifying micelles, which may, inter alia, facilitate an increase in the viscosity of the viscoelastic surfactant fluid. In certain embodiments, the redox agent may be capable of changing iron III to iron II. In other embodiments, the redox reagent may comprise a reagent that is capable of changing the oxidation state of the metal ion to a state that exhibits an increased tendency to interfere with the ability of the surfactant to form viscosifying micelles, which may, inter alia, facilitate a reduction in the viscosity of the viscoelastic surfactant fluid. For example, in certain embodiments, the redox agent may be capable of changing iron II to iron III. Depending on the desired function of the redox reagent in a particular application of the present invention (i.e., oxidizing or reducing the metal ion(s)), the redox reagent may comprise a reducing agent or an oxidizing agent. Examples of suitable reducing agents include, but are not limited to, thioglycolic acid (or a salt thereof), erythorbic acid (or a salt thereof), and stannous chloride. Fe-5A™ iron control agent and Fe-8M™ iron control agent, available from Halliburton Energy Services, Inc., Duncan, Okla., are examples of commercially-available reducing agents. Examples of suitable oxidizing agents include, but are not limited to, sodium persulfate, potassium persulfate, ammonium persulfate, potassium permanganate, sodium permanganate, sodium perborate, potassium perborate, sodium periodate, potassium periodate, sodium bromate and lithium hypochlorite. Examples of commercially-available oxidizing agents include SP™ Breaker agent available from Halliburton Energy Services, Inc, Duncan, Okla., OXOL™ II Cleaning service available from Halliburton Energy Services, Inc, Duncan, Okla., and GBW-40™ Breaker available from Halliburton Energy Services, Inc, Duncan, Okla.

The redox reagents utilized in the present invention may be formulated to change the oxidation state of the metal ion(s) in a delayed manner, or to be "triggered" by certain conditions (e.g., temperature, pH, etc.). For example, the redox reagent may be encapsulated with various materials, which, among other things, may delay its reaction with the metal ion. Solid redox reagents can be encapsulated by any suitable technique including spray coating a variety of coating materials thereon. Such coating materials include, but are not limited to, waxes, drying oils such as tung oil and linseed oil, polyurethanes and cross-linked partially hydrolyzed polyacrylics. The redox reagent also may be encapsulated in the form of an aqueous solution contained within a particulate porous solid material that remains dry and free flowing after absorbing an aqueous solution and through which the aqueous solution slowly diffuses. Examples of such particulate porous solid materials include, but are not limited to, diatomaceous earth, zeolites, silica, alumina, metal salts of alumino-silicates, clays, hydrotalcite, styrene-divinylbenzene based materials, cross-linked polyalkylacrylate esters, and cross-linked modified starches. In order to provide additional delay to the redox reagents encapsulated in a particulate porous solid material described above, an external coating of a polymeric material through which an aqueous solution slowly diffuses can be placed on the porous solid material. Examples of such polymeric materials include, but are not limited to, EDPM rubber, polyvinyldichloride (PVDC), nylon, waxes, polyurethanes and cross-linked partially hydrolyzed acrylics. In other embodiments, the redox reagent may be formulated in such a way that it becomes reactive only at certain temperatures. An example of a commercially-available redox reagent that reacts in this manner is Ferchek® ferric iron inhibitor, an iron reducing agent available from Halliburton Energy Services, Inc., Duncan, Okla.

The redox reagent may be present in the viscoelastic surfactant fluids of the present invention in any amount sufficient to change the oxidation state of at least a portion of the metal ion(s) present. In certain embodiments, the redox reagent may be present in an amount in the range of from about 0.01% to about 10% by volume of the viscoelastic surfactant fluid. In certain embodiments, the redox reagent may be present in an amount in the range of from about 0.05% to about 2% by volume of the viscoelastic surfactant fluid. The amount of the redox reagents suitable in a particular application of the present invention may depend upon a variety of factors, such as the type of surfactant present in the viscoelastic surfactant fluid, the amount of metal ion(s) present, the temperature of the fluid, and the like. A person of ordinary skill, with the benefit of this disclosure, will recognize the appropriate amount of the redox reagent to include in a particular application of the present invention.

The viscoelastic surfactant fluids and additives of the present invention optionally may comprise one or more cosurfactants, among other purposes, to facilitate the formation of and/or stabilize a foam, facilitate the formation of micelles (e.g., viscosifying micelles), increase salt tolerability, and/or stabilize the viscoelastic surfactant fluid. The cosurfactant may comprise any surfactant suitable for use in subterranean environments that does not adversely affect the viscoelastic surfactant fluid. Examples of suitable cosurfactants are described in U.S. Pat. No. 6,258,859, the relevant disclosure of which is incorporated herein by reference. Examples of cosurfactants suitable for use in the present invention include, but are not limited to, linear $C_{10}$-$C_{14}$ alkyl benzene sulfonates ("LAS"), branched $C_{10}$-$C_{14}$ alkyl benzene sulfonates ("ABS"), tallow alkyl sulfates, coconut alkyl glyceryl ether sulfonates, sulfated condensation products of mixed $C_{10}$-$C_{18}$ tallow alcohols with from about 1 to about 14 moles of ethylene oxide, and mixtures of higher fatty acids containing from about 10 to about 18 carbon atoms. In certain embodiments, the cosurfactant may be present in an amount in the range of from about 0.1% to about 2% by volume of the viscoelastic surfactant fluid. In certain embodiments, the cosurfactant may be present in an amount in the range of from about 0.25% to about 0.5% by volume of the viscoelastic surfactant fluid. The type and amount of a cosurfactant suitable in a particular application of the present invention may depend upon a variety of factors, such as the type of surfactant present in the viscoelastic surfactant fluid, the composition of the aqueous-base fluid, the temperature of the fluid, and the like. A person of ordinary skill, with the benefit of this disclosure, will recognize when to include a cosurfactant in a particular application of the present invention, as well as the appropriate type and amount of cosurfactant to include.

The viscoelastic surfactant fluids of the present invention optionally may comprise one or more salts, among other purposes, to modify the rheological properties (e.g., viscosity) of the viscoelastic surfactant fluids. The salts may be organic or inorganic. Examples of suitable organic salts include but are not limited to aromatic sulfonates and carboxylates (such as p-toluene sulfonate, naphthalene sulfonate), hydroxynaphthalene carboxylates, salicylate, phthalate, chlorobenzoic acid, salicylic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride. Examples of suitable inorganic salts include water-soluble potassium, sodium, and ammonium salts, (such as potassium chloride and ammonium chloride), calcium chloride, calcium bromide, magnesium chloride and zinc halide salts. Examples of viscoelastic surfactant fluids comprising salts suitable for use in the present invention are described in U.S. patent application Publication No. 2004/0176478, the relevant disclosure of which is incorporated herein by reference. Any combination of the salts listed above also may be included in the viscoelastic surfactant fluids of the present invention. Where included, the one or more salts may be present in an amount in the range of from about 0.1% to about 30% by weight of the viscoelastic surfactant fluid. In certain embodiments, the one or more salts may be present in an amount in the range of from about 0.1% to about 10% by weight of the viscoelastic surfactant fluid. The type and amount of salts suitable in a particular application of the present invention may depend upon a variety of factors, such as the type of surfactant present in the viscoelastic surfactant fluid, the composition of the aqueous-base fluid, the temperature of the fluid, and the like. A person of ordinary skill, with the benefit of this disclosure, will recognize when to include a salt in a particular application of the present invention, as well as the appropriate type and amount of salts to include.

The viscoelastic surfactant fluids of the present invention optionally may include one or more of a variety of well-known additives, such as gel stabilizers, fluid loss control additives, particulates, acids, corrosion inhibitors, catalysts, clay stabilizers, biocides, friction reducers, additional surfactants, solubilizers, pH adjusting agents, bridging agents, dispersants, flocculants, foamers, gases, defoamers, $H_2S$ scavengers, $CO_2$ scavengers, oxygen scavengers, scale inhibitors, lubricants, viscosifiers, weighting agents, and the like. Those of ordinary skill in the art, with the benefit of this disclosure, will be able to determine the appropriate type and amount of such additives for a particular application. For example, in some embodiments, it may be desired to foam a viscoelastic surfactant fluid of the present invention using a gas, such as air, nitrogen, or carbon dioxide. In certain embodiments, an acid may be included in a viscoelastic surfactant fluid of the present invention, among other purposes, to dissolve at least a portion of a subterranean formation contacted with the viscoelastic surfactant fluid.

The methods of the present invention generally comprise: providing a viscoelastic surfactant fluid that comprises an aqueous-base fluid and a surfactant; providing a metal ion having at least two oxidation states wherein at least one of the oxidation states interferes with the ability of the surfactant to form viscosifying micelles. In certain embodiments, the metal ion may be allowed to interact with the viscoelastic surfactant fluid so as to interfere with the ability of the surfactant to form viscosifying micelles. In other embodiments, the methods of the present invention further may comprise providing a redox reagent and allowing the redox reagent to change the oxidation state of at least a portion of the metal ion to an oxidation state different from that which interferes with the ability of the surfactant to form viscosifying micelles.

The viscoelastic surfactant fluids and methods of the present invention may be used in any subterranean application where a fluid exhibiting viscoelastic properties may be used. Suitable subterranean operations may include, but are not limited to, drilling operations, fracturing treatments, sand control treatments (e.g., gravel packing), acidizing treatments, frac-pack treatments, and other suitable treatments where a treatment fluid of the present invention may be suitable. For example, in certain embodiments of the present invention involving acidizing treatments, a viscoelastic surfactant fluid of the present invention comprising an acid may be introduced into a subterranean formation so as to react with acid-soluble substances in at least a portion of the formation (e.g., carbonate minerals). Among other things, this may enlarge the pore spaces in that portion of the formation, and/or enhance the production of fluids from the formation.

In utilizing the methods of the present invention, the viscoelastic surfactant fluids may be formulated in such a way that the viscosity of the fluid used may be increased or decreased at any point in the course of a particular subterranean operation, for example, prior to, during, or subsequent to introducing the viscoelastic surfactant fluid into a subterranean formation. For example, the viscoelastic surfactant fluid may contain a certain concentration of metal ions in an oxidation state that interferes with the ability of the surfactant to form viscosifying micelles such that the viscosity of the viscoelastic surfactant fluid initially may be low, and the concentration of the metal ions in that oxidation state may be reduced at some point thereafter so as to allow the surfactant to form viscosifying micelles, which may, inter alia, facilitate an increase in the viscosity of the fluid. In some embodiments, a viscoelastic surfactant fluid, comprising an aqueous-base fluid, a surfactant, and a metal ion having at least two oxidation states wherein at least a portion of the metal ion is present in an oxidation state that does not interfere with the ability of the surfactant to form viscosifying micelles, may be provided, for example, in a portion of a subterranean formation. The concentration of metal ions in an oxidation state that interferes with the ability of the surfactant to form viscosifying micelles may be increased in the fluid (e.g., by adding those metal ions directly to the fluid, or by allowing a redox reagent to change the oxidation state of metal ions already present in the fluid to that oxidation state), and allowed to interact with the viscoelastic surfactant fluid so as to interfere with the ability of the surfactant to form viscosifying micelles. This may, among other things, decrease the viscosity of the viscoelastic surfactant fluid.

In certain embodiments, a viscoelastic surfactant fluid of the present invention may be introduced into a portion of the subterranean formation so as to form a gel sufficient to divert at least a portion of a second fluid to a different portion of the subterranean formation, for example, by forming a gel plug. The gel may be formed, among other ways, by decreasing the concentration of the metal ion in an oxidation state that interferes with the ability of the surfactant to form viscosifying micelles. The viscoelastic surfactant fluid should be formulated such that it is, or may form, a gel sufficient to divert the flow of a second fluid. The viscosity of the gel necessary to divert the flow of a second fluid may depend on, among other factors, the depth of the gel plug created, the size of the pore spaces in the formation, the strength of any acid used, the composition of the second fluid to be diverted, the temperature of the subterranean formation, and differential pressure. After the second fluid has been diverted in the desired manner, the viscosity of the viscoelastic treatment fluid may be reduced, among other things, by increasing the concentration of the metal ion in an oxidation state that interferes with the ability of the surfactant to form viscosifying micelles. Those of ordinary skill in the art, with the benefit of this disclosure, will be able to formulate the viscoelastic surfactant fluid in a manner suitable for a particular application.

To facilitate a better understanding of the present invention, the following examples of certain aspects of some embodiments are given. In no way should the following examples be read to limit, or define, the scope of the invention.

EXAMPLES

Example 1

Two samples of a viscoelastic surfactant fluid were each prepared in accordance with the following procedure: 12 mL FDP-S739-04 surfactant, an amphoteric surfactant in glycol available from Halliburton Energy Services, Duncan, Okla., was added to separate 250 mL bottles. Then, a brine having a composition 18% $CaCl_2$/18% $MgCl_2$ by weight was added to each bottle to yield a final volume of 200 mL. The pH of the sample was adjusted to ~pH 4 with HCl where needed. The rheological properties of these initial fluid samples (Fluid Nos. A1 & B1 in Table 1 below) were observed. Then, a series of compounds were added to the fluid sample, as described in Table 1 below. After the addition of each compound, the rheological properties were observed and recorded (as described in Table 1 below) using a FANN Model 35A viscometer with a standard bob and sleeve using a #1 spring at 300 rpm (511 $s^{-1}$).

TABLE 1

| Fluid No. | Fluid No. + Compound Added | Apparent viscosity (cP) |
|---|---|---|
| A1 | (Initial fluid) | 44 |
| A2 | Fluid No. A1 + 1 mL $FeCl_3$ solution[1] | 22 |
| A3 | Fluid No. A2 + 1 mL thioglycolic acid | 31 |
| A4 | Fluid No. A3 + 0.75 g sodium persulfate | 11 |
| B1 | (Initial fluid) | 44 |
| B2 | Fluid No. B1 + 0.5 g $FeCl_2 \cdot 4H_2O$ | 32 |
| B3 | Fluid No. B2 + 0.5 g sodium persulfate | 19 |
| B4 | Fluid No. B3 + 0.75 mL thioglycolic acid | 27 |

[1]The composition of the $FeCl_3$ solution was 60% by weight $FeCl_3 \cdot 6H_2O$ in water.

Example 2

Five samples of a viscoelastic surfactant fluid were each prepared in accordance with the following procedure: 10 mL FDP-S740-04 surfactant, a cationic surfactant in glycol available from Halliburton Energy Services, Duncan, Okla., was added to separate 250 mL bottles. Then, a brine having a composition 18% $CaCl_2$/18% $MgCl_2$ by weight was added to each bottle to yield a final volume of 200 mL. The pH of the sample was adjusted to ~pH 4 with HCl where needed. The rheological properties of these initial fluid samples (Fluid Nos. C1, D1, E1, F1, G1 in Table 2 below) were observed. Then, a series of compounds were added to the fluid sample, as described in Table 2 below. After the addition of each compound, the rheological properties were observed and recorded (as described in Table 2 below) using a FANN Model 35A viscometer with a standard bob and sleeve using a #1 spring at 300 rpm (511 $s^{-1}$).

TABLE 2

| Fluid No. | Fluid No. + Compound Added | Apparent viscosity (cP) |
|---|---|---|
| C1 | (Initial fluid) | 270 |
| C2 | Fluid No. C1 + 1 mL FeCl$_3$ solution[1] | 27 |
| C3 | Fluid No. C2 + 1 mL thioglycolic acid | 116 |
| C4 | Fluid No. C3 + 0.75 g sodium persulfate | 32 |
| D1 | (Initial fluid) | 270 |
| D2 | Fluid No. D1 + 0.5 g FeCl$_2$•4H$_2$O | 295 |
| D3 | Fluid No. D2 + 0.5 g sodium persulfate | 30 |
| D4 | Fluid No. D3 + 0.75 mL thioglycolic acid | 211 |
| E1 | (Initial fluid) | 270 |
| E2 | Fluid No. E1 + 0.5 g ZnBr$_2$ | 31 |
| F1 | (Initial fluid) | 270 |
| F2 | Fluid No. F1 + 0.5 g ZnCl$_2$ | 23 |
| G1 | (Initial fluid) | 270 |
| G2 | Fluid No. G1 + 1 mL SnCl$_2$ (60% by wt. in H$_2$O) | 12 |

[1]The composition of the FeCl$_3$ solution was 60% by weight FeCl$_3$•6H$_2$O in water.

Example 3

Two samples of a viscoelastic surfactant fluid were each prepared in accordance with the following procedure: 8 mL Ethomeen T/12™, a cationic surfactant, and 2 mL Rewoteric AM TEG™, an amphoteric surfactant, were both added to separate 250 mL bottles. Then, deionized water and concentrated hydrochloric acid was added to each bottle to yield a final volume of 200 mL with a final concentration of 15% hydrochloric acid by volume. The rheological properties of these initial fluid samples (Fluid Nos. H1 and J1 in Table 3 below) were observed. Then, a series of compounds were added to the fluid sample, as described in Table 3 below. After the addition of each compound, the rheological properties were observed and recorded (as described in Table 3 below) using a FANN Model 35A viscometer with a standard bob and sleeve using a #1 spring at 300 rpm (511 $s^{-1}$).

TABLE 3

| Fluid No. | Fluid No. + Compound Added | Apparent viscosity (cP) |
|---|---|---|
| H1 | (Initial fluid) | 215 |
| H2 | Fluid No. H1 + 1 mL FeCl$_3$ solution[1] | 100 |
| H3 | Fluid No. H2 + 1 mL thioglycolic acid | 155 |
| H4 | Fluid No. H3 + 0.75 g sodium persulfate | 111 |
| J1 | (Initial fluid) | 215 |
| J2 | Fluid No. J1 + 0.5 g FeCl$_2$•4H$_2$O | 235 |
| J3 | Fluid No. J2 + 0.5 g sodium persulfate | 117 |
| J4 | Fluid No. J3 + 0.75 mL thioglycolic acid | 152 |

[1]The composition of the FeCl$_3$ solution was 60% by weight FeCl$_3$•6H$_2$O in water.

Example 4

Samples of two different viscoelastic surfactant fluids were prepared in accordance with the following procedure: 10 mL Ethomeen T/12™, a cationic surfactant, and 10 mL Ethomeen S/12™, another cationic surfactant, were each added to separate 250 mL bottles. Then, deionized water and concentrated hydrochloric acid was added to each bottle to yield a final volume of 200 mL with a final concentration of 15% hydrochloric acid by volume. The rheological properties of these initial fluid samples (Fluid Nos. K1 & L1, respectively, in Table 4 below) were observed. Then, 1 mL of an aqueous solution of FeCl$_3$ (60% by weight FeCl$_3$·6H$_2$O) was added to each sample, and the rheological properties were observed and recorded (Fluid Nos. K2 & L2, respectively, in Table 4 below) using a FANN Model 35A viscometer with a standard bob and sleeve using a #1 spring at 300 rpm (511 $s^{-1}$).

TABLE 4

| Fluid No. | Fluid No. + Compound Added | Apparent viscosity (cP) |
|---|---|---|
| K1 | (Initial fluid) | 300+ |
| K2 | Fluid No. K1 + 1 mL FeCl$_3$ solution[1] | 103 |
| L1 | (Initial fluid) | 105 |
| L2 | Fluid No. L1 + 1 mL FeCl$_3$ solution | 17 |

[1]The composition of the FeCl$_3$ solution was 60% by weight FeCl$_3$.6H$_2$0 in water.

Thus, Examples 1-4 illustrate that the methods of the present invention may be used to control the viscosity of a viscoelastic surfactant fluid.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method comprising:
   providing a viscoelastic surfactant fluid that comprises
      an aqueous-base fluid, and
      a surfactant;
   providing a metal ion having at least two oxidation states wherein at least one of the oxidation states interferes with the ability of the surfactant to form a viscosifying micelle, wherein at least a portion of the metal ion is present in an oxidation state that interferes with the ability of the surfactant to form a viscosifying micelle in an amount above about 1000 parts per million by volume of the viscoelastic surfactant fluid;
   allowing the metal ion to interact with viscoelastic surfactant fluid so as to interfere with the ability of the surfactant to form a viscosifying micelle; and
   introducing the viscoelastic surfactant fluid into at least a portion of a subterranean formation.

2. The method of claim 1 wherein the surfactant is selected from the group consisting of methyl ester sulfonates, betaines, modified betaines, sulfosuccinates, amine oxides, ethoxylated fatty amines, quaternary ammonium compounds, derivatives thereof and combinations thereof.

3. The method of claim 1 wherein the metal ion is selected from the group consisting of iron, zinc, tin, chromium, and combinations thereof.

4. The method of claim 1 wherein the metal ion comprises iron, and wherein at least a portion of the iron is in the iron III oxidation state.

5. The method of claim 4 further comprising:
   providing a reducing agent;

allowing the reducing agent to interact with the iron, thereby changing at least a portion of the iron from the iron III oxidation state to the iron II oxidation state; and allowing the surfactant to form a plurality of micelles.

6. The method of claim 5 wherein the reducing agent is selected from the group consisting of thioglycolic acid, erythorbic acid, stannous chloride, derivatives thereof, and combinations thereof.

7. The method of claim 1 further comprising:
providing a redox reagent that is capable of changing the oxidation state of the metal ion to an oxidation state different from that which interferes with the ability of the surfactant to form a viscosifying micelle;
allowing the redox reagent to interact with the metal ion, thereby changing the oxidation state of at least a portion of the metal ion to an oxidation state different from that which interferes with the ability of the surfactant to form a viscosifying micelle; and
allowing the surfactant to form at least one viscosifying micelle, thereby facilitating an increase in the viscosity of the viscoelastic surfactant fluid.

8. The method of claim 7 wherein the redox reagent is selected from the group consisting of thioglycolic acid, erythorbic acid, stannous chloride, sodium persulfate, potassium persulfate, ammonium persulfate, potassium permanganate, sodium permanganate, sodium perborate, potassium perborate, lithium hypochlorite, sodium periodate, potassium periodate, sodium bromate, derivatives thereof, and combinations thereof.

9. The method of claim 7 wherein facilitating an increase in the viscosity of the viscoelastic surfactant fluid comprises forming a gel.

10. A method comprising:
providing a viscoelastic surfactant fluid that comprises
an aqueous-base fluid,
a surfactant, and
a metal ion having at least two oxidation states wherein at least one of the oxidation states interferes with the ability of the surfactant to form viscosifying micelles, wherein at least a portion of the metal ion is present in an oxidation state that interferes with the ability of the surfactant to form a viscosifying micelle;
introducing the viscoelastic surfactant fluid into at least a portion of a subterranean formation;
providing a redox reagent that is capable of changing the oxidation state of the metal ion to an oxidation state different from that which interferes with the ability of the surfactant to form a viscosifying micelle;
allowing the redox reagent to interact with the metal ion, thereby changing the oxidation state of at least a portion of the metal ion to an oxidation state different from that which interferes with the ability of the surfactant to form a viscosifying micelle; and
allowing the surfactant to form at least one viscosifying micelle, thereby facilitating an increase in the viscosity of the viscoelastic surfactant fluid.

11. The method of claim 10 wherein the surfactant is selected from the group consisting of methyl ester sulfonates, betaines, modified betaines, sulfosuccinates, amine oxides, ethoxylated fatty amines, quaternary ammonium compounds, derivatives thereof and combinations thereof.

12. The method of claim 10 wherein the concentration of the metal ion that is in an oxidation state that interferes with the ability of the surfactant to form a viscosifying micelle before the step of allowing the redox reagent to change the oxidation state of at least a portion of the metal ion is above about 1000 parts per million by volume of the viscoelastic surfactant fluid.

13. The method of claim 10 wherein the metal ion is selected from the group consisting of iron, zinc, tin, chromium, and combinations thereof.

14. The method of claim 10 wherein the redox reagent is selected from the group consisting of thioglycolic acid, erythorbic acid, stannous chloride, sodium persulfate, potassium persulfate, ammonium persulfate, potassium permanganate, sodium permanganate, sodium perborate, potassium perborate, lithium hypochlorite, sodium periodate, potassium periodate, sodium bromate, derivatives thereof, and combinations thereof.

15. The method of claim 10 wherein facilitating an increase in the viscosity of the viscoelastic surfactant fluid comprises forming a gel.

16. The method of claim 10 further comprising:
providing a second redox reagent that is capable of changing the oxidation state of the metal ion to an oxidation state that interferes with the ability of the surfactant to form a viscosifying micelle;
allowing the second redox reagent to interact with the metal ion, thereby changing the oxidation state of at least a portion of the metal ion to an oxidation state that interferes with the ability of the surfactant to form a viscosifying micelle; and
allowing the metal ion to interact with the viscoelastic surfactant fluid so as to interfere with the ability of the surfactant to form a viscosifying micelle, thereby facilitating a reduction in the viscosity of the viscoelastic surfactant fluid.

17. The method of claim 16 wherein the second redox reagent is selected from the group consisting of thioglycolic acid, erythorbic acid, stannous chloride, sodium persulfate, potassium persulfate, ammonium persulfate, potassium permanganate, sodium permanganate, sodium perborate, potassium perborate, lithium hypochlorite, sodium periodate, potassium periodate, sodium bromate, derivatives thereof, and combinations thereof.

18. A method comprising:
providing a viscoelastic surfactant fluid that comprises
an aqueous-base fluid,
a surfactant, and
a metal ion having at least two oxidation states wherein at least one of the oxidation states interferes with the ability of the surfactant to form a viscosifying micelle;
providing a first redox reagent that is capable of changing the oxidation state of the metal ion to an oxidation state that interferes with the ability of the surfactant to form a viscosifying micelle;
allowing the redox reagent to change the oxidation state of at least a portion of the metal ion to an oxidation state that interferes with the ability of the surfactant to form a viscosifying micelle;
allowing the metal ion to interact with viscoelastic surfactant fluid so as to interfere with the ability of the surfactant to form a viscosifying micelle;
providing a second redox reagent that is capable of changing the oxidation state of the metal ion to an oxidation state that does not interfere with the ability of the surfactant to form a viscosifying micelle;
allowing the second redox reagent to change the oxidation state of at least a portion of the metal ion to an oxidation state that does not interfere with the ability of the surfactant to form a viscosifying micelle; and allowing the surfactant to form at least one viscosifying micelle, thereby facilitating an increase in the viscosity of the viscoelastic surfactant fluid.

19. The method of claim 18 wherein the surfactant is selected from the group consisting of methyl ester sulfonates, betaines, modified betaines, sulfosuccinates, amine oxides, ethoxylated fatty amines, quaternary ammonium compounds, derivatives thereof and combinations thereof.

20. The method of claim 18 wherein the concentration of the metal ion that is in an oxidation state that interferes with the ability of the surfactant to form a viscosifying micelle after the step of allowing the first redox reagent to change the oxidation state of at least a portion of the metal ion is above about 1000 parts per million by volume of the viscoelastic surfactant fluid.

21. The method of claim 18 wherein the metal ion is selected from the group consisting of iron, zinc, tin, chromium, and combinations thereof.

22. The method of claim 18 wherein the first redox reagent is selected from the group consisting of thioglycolic acid, erythorbic acid, stannous chloride, sodium persulfate, potassium persulfate, ammonium persulfate, potassium permanganate, sodium permanganate, sodium perborate, potassium perborate, lithium hypochlorite, sodium periodate, potassium periodate, sodium bromate, derivatives thereof, and combinations thereof.

23. The method of claim 18 wherein the second redox reagent is selected from the group consisting of thioglycolic acid, erythorbic acid, stannous chloride, sodium persulfate, potassium persulfate, ammonium persulfate, potassium permanganate, sodium permanganate, sodium perborate, potassium perborate, lithium hypochlorite, sodium periodate, potassium periodate, sodium bromate, derivatives thereof, and combinations thereof.

24. The method of claim 18 wherein facilitating an increase in the viscosity of the viscoelastic surfactant fluid comprises forming a gel.

* * * * *